US012487751B2

(12) United States Patent
Gupta et al.

(10) Patent No.: US 12,487,751 B2
(45) Date of Patent: Dec. 2, 2025

(54) DATA STORAGE DEVICE AND METHOD FOR HANDLING LIFETIME READ DISTURB

(71) Applicant: Sandisk Technologies, Inc., Milpitas, CA (US)

(72) Inventors: Mahim Gupta, San Jose, CA (US); Piyush A. Dhotre, San Jose, CA (US); Daivik Bychapur Manjunatha, Milpitas, CA (US); Leeladhar Agarwal, Fremont, CA (US)

(73) Assignee: Sandisk Technologies, Inc., Milpitas, CA (US)

( * ) Notice: Subject to any disclaimer, the term of this patent is extended or adjusted under 35 U.S.C. 154(b) by 72 days.

(21) Appl. No.: 18/636,509

(22) Filed: Apr. 16, 2024

(65) Prior Publication Data
US 2025/0321680 A1 Oct. 16, 2025

(51) Int. Cl.
*G06F 3/06* (2006.01)
(52) U.S. Cl.
CPC ............ *G06F 3/0616* (2013.01); *G06F 3/064* (2013.01); *G06F 3/0653* (2013.01); *G06F 3/0679* (2013.01)
(58) Field of Classification Search
CPC .... G06F 3/0616; G06F 3/0653; G06F 3/0679; G06F 3/0659; G06F 3/0604; G06F 3/0619; G06F 3/0632; G06F 11/073; G06F 11/076; G06F 11/106; G06F 11/108; G06F 11/2094; G06F 2201/82; G11C 16/0483; G11C 16/08; G11C 16/26; G11C 16/28; G11C 16/16; G11C 16/32; G11C 16/3427; G11C 16/3445; G11C 16/10; G11C 16/14; G11C 16/24; G11C 16/34; G11C 16/3431; G11C 16/0433; G11C 16/102; G11C 16/30; G11C 16/3404; G11C 16/3409; G11C 16/3418; G11C 16/3477; G11C 16/12; G11C 16/20; G11C 16/349; G11C 16/3495; G11C 11/5642; G11C 11/5628; G11C 11/5635; G11C 2029/0409; G11C 29/028; G11C 29/38; G11C 29/44; G11C 7/04

See application file for complete search history.

(56) References Cited

U.S. PATENT DOCUMENTS

| | | | |
|---|---|---|---|
| 2016/0342494 A1* | 11/2016 | Yang | G06F 11/1072 |
| 2017/0229184 A1* | 8/2017 | Yamauchi | G11C 16/3459 |
| 2021/0233594 A1* | 7/2021 | Batutis | G11C 16/349 |
| 2024/0153570 A1* | 5/2024 | Xu | G11C 29/52 |
| 2024/0161838 A1* | 5/2024 | Ciocchini | G11C 11/5642 |

* cited by examiner

*Primary Examiner* — Curtis James Kortman
(74) *Attorney, Agent, or Firm* — Crowell & Moring LLP

(57) ABSTRACT

A block of memory in a data storage device can experience a read disturb based on how many times the block of memory was read, as well as on the program-erase count of the block. Non-data wordline maintenance triggered by program-erase count can address the read disturb in some situations but not in others, such as when a host is very read intensive and does not write to the memory that often. In one embodiment, maintenance on a non-data wordline in a block of memory is performed in response to the lifetime total amount of data read from the block being above a threshold. In another embodiment, a block is allocated for use based on the lifetime read count of the block and not only on the program-erase count of the block. Other embodiments are disclosed.

11 Claims, 11 Drawing Sheets

| Description | Data | Metric |
|---|---|---|
| Total TBR | 450 | TB |
| Threshold for TBR | 225 | TB |
| Drive capacity | 512 | GB |
| # of dies/drive | 8 | |
| Total TBR/Die | 56.25 | |
| # of blks/plane | 832 | |
| # of planes | 4 | |
| # of blks/die | 3328 | |
| Total TBR/blk | 0.016902043 | |
| Total KBR/Blk | 16648512.62 | |
| Read cmd size | 16 | KB |
| Total # of reads/die | 1040532.039 | ~1.04M |

FIG. 5

DATA STORAGE DEVICE AND METHOD FOR HANDLING LIFETIME READ DISTURB

BACKGROUND

Typical read disturb (RD) phenomenon in a block of memory can get corrected once the block is erased and programmed. With newer three-dimensional memory generations, there can be a limit on the total number of reads that a block can sustain throughout its life. This is termed as accumulated read disturb or lifetime read disturb. The lifetime read disturb constraint is due the threshold voltage (Vt) of any of the non-data wordlines (NDWLs) moving out of a designated threshold voltage (Vt) window. The NDWL disturb can also happen due to the total number of reads as opposed to the total number of program/erase cycles in earlier memory generations. Once the select gate on the drain side (SGD) is disturbed beyond a certain limit, it can result in data loss for the user, and the block can become un-usable.

BRIEF DESCRIPTION OF THE DRAWINGS

FIG. 5 is a table of a total byte read threshold calculation for an embodiment.

DETAILED DESCRIPTION

The following embodiments generally relate to a data storage device and method for handling lifetime read disturb. In one embodiment, a data storage device is provided comprising a memory and one or more processors. The one or more processors, individually or in combination, are configured to: read a block in the memory; determine whether a lifetime total amount of data read from the block is above a first threshold; and in response to determining that the lifetime total amount of data read from the block is above the first threshold, perform maintenance on the non-data wordline in the block.

In another embodiment, a method is provided that is performed in a data storage device comprising a memory comprising a plurality of blocks. The method comprises: selecting, from the plurality of blocks, a block with a lowest program-erase count for possible allocation; determining whether a lifetime read count of the block is greater than a threshold; in response to determining that the lifetime read count of the block is not greater than the threshold, allocating the block; and in response to determining that the lifetime read count of the block is greater than the threshold, selecting another block from the plurality of blocks for possible allocation.

In yet another embodiment, a data storage device is provided comprising: a memory; and means for handling a lifetime read disturb of a block of the memory based on how much the block of the memory was been read instead of on just how many times the block of the memory was programmed and erased.

Other embodiments are possible, and each of the embodiments can be used alone or together in combination. Accordingly, various embodiments will now be described with reference to the attached drawings.

Embodiments

The following embodiments relate to a data storage device (DSD). As used herein, a "data storage device" refers to a non-volatile device that stores data. Examples of DSDs include, but are not limited to, hard disk drives (HDDs), solid state drives (SSDs), tape drives, hybrid drives, etc. Details of example DSDs are provided below.

Figure 1A:
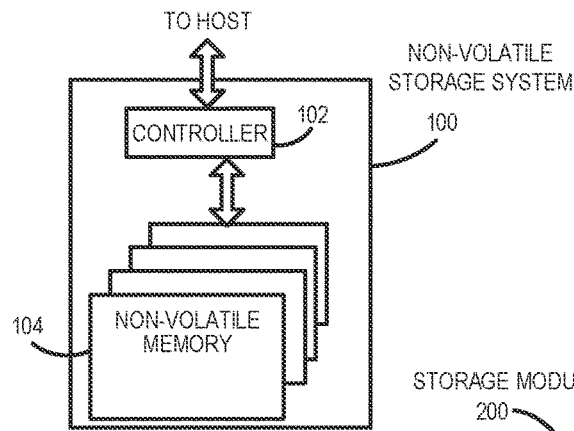
FIG. 1A is a block diagram of a data storage device of an embodiment.
Figure 1B:
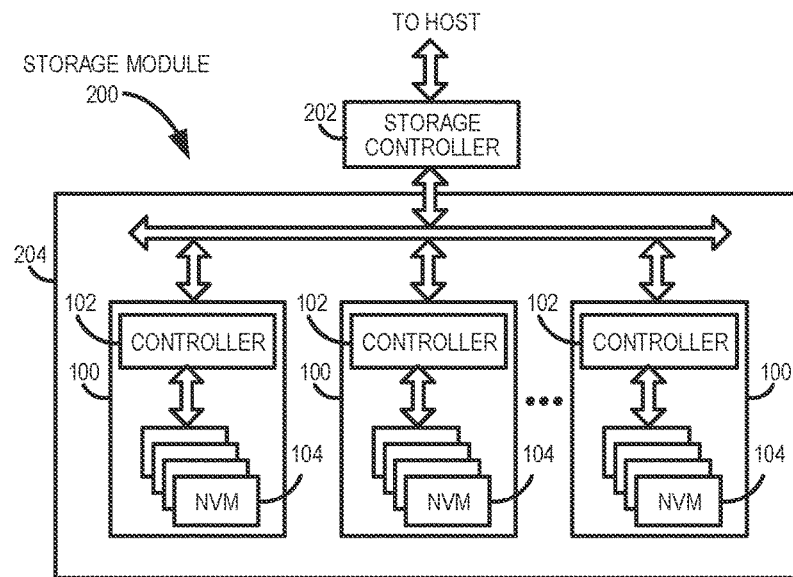
FIG. 1B is a block diagram illustrating a storage module of an embodiment.
Figure 1C:
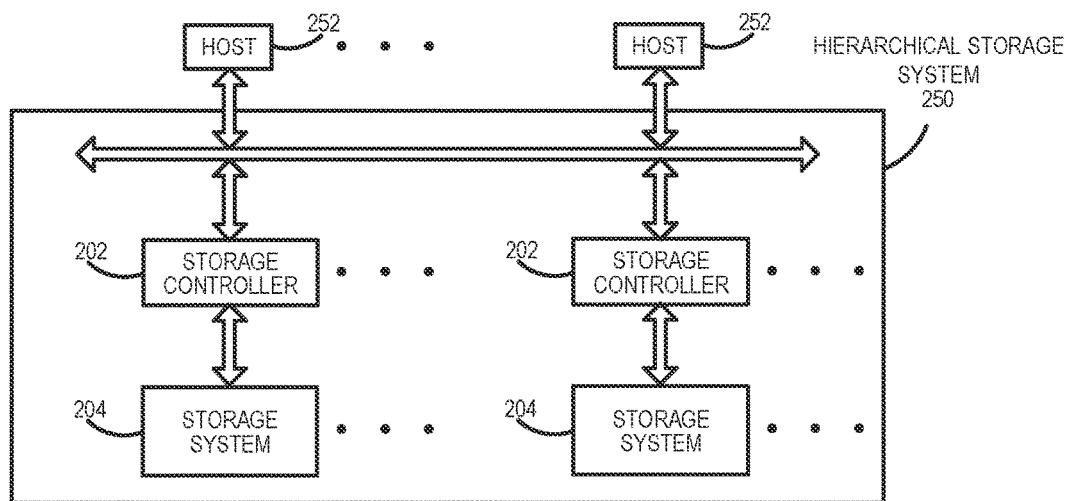
FIG. 1C is a block diagram illustrating a hierarchical storage system of an embodiment.

Examples of data storage devices suitable for use in implementing aspects of these embodiments are shown in FIGS. 1A-1C. It should be noted that these are merely examples and that other implementations can be used. FIG. 1A is a block diagram illustrating the data storage device 100 according to an embodiment. Referring to FIG. 1A, the data storage device 100 in this example includes a controller 102 coupled with a non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. The controller 102 interfaces with a host system and transmits command sequences for read, program, and erase operations to non-volatile memory die 104. Also, as used herein, the phrase "in communication with" or "coupled with" could mean directly in communication/coupled with or indirectly in communication/coupled with through one or more components, which may or may not be shown or described herein. The communication/coupling can be wired or wireless.

Figure 2A:
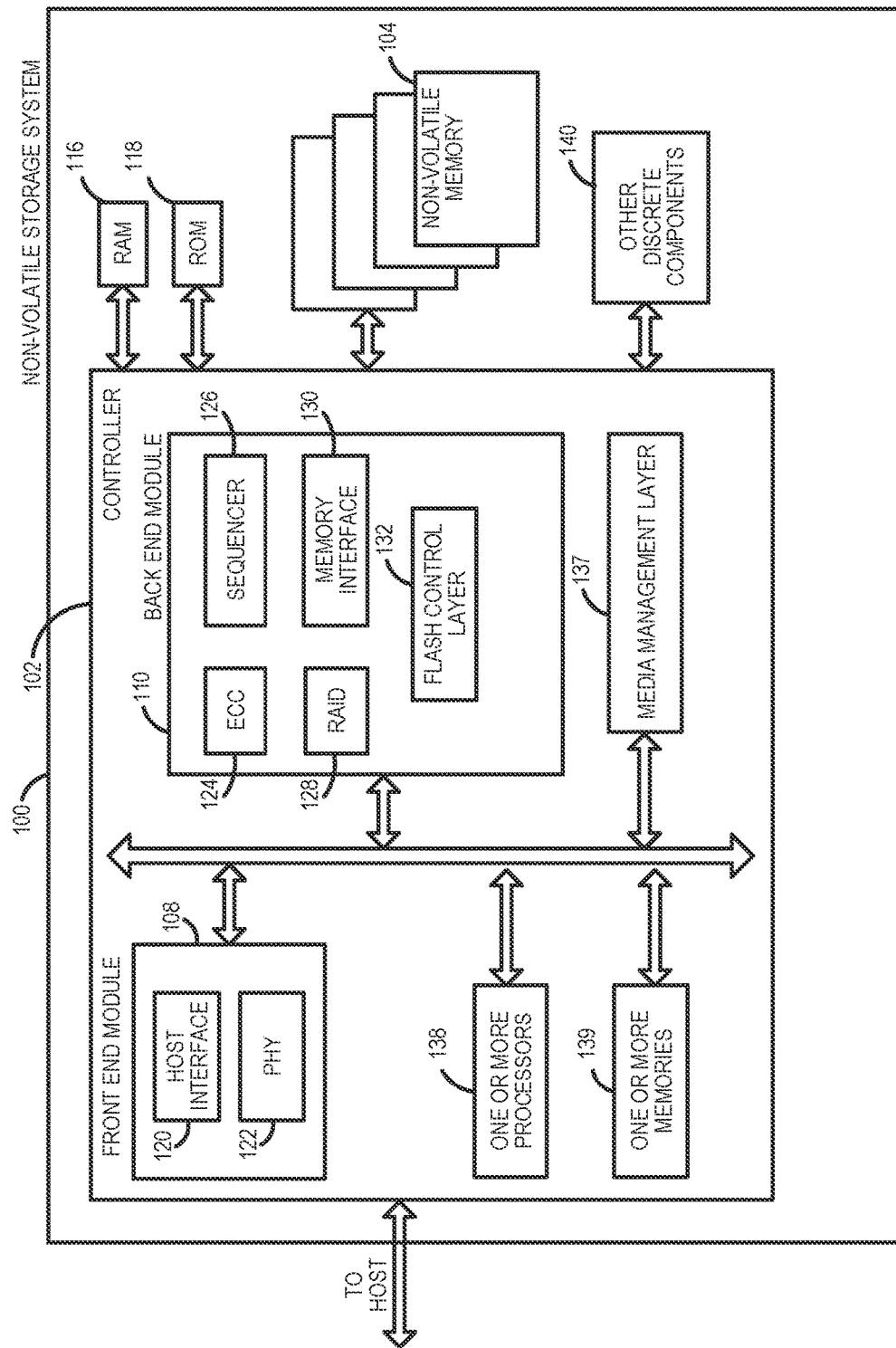
FIG. 2A is a block diagram illustrating components of the controller of the data storage device illustrated in FIG. 1A according to an embodiment.

The controller 102 (which may be a non-volatile memory controller (e.g., a flash, resistive random-access memory (ReRAM), phase-change memory (PCM), or magnetoresistive random-access memory (MRAM) controller)) can include one or more components, individually or in combination, configured to perform certain functions, including, but not limited to, the functions described herein and illustrated in the flow charts. For example, as shown in FIG. 2A, the controller 102 can comprise one or more processors 138 that are, individually or in combination, configured to perform functions, such as, but not limited to the functions described herein and illustrated in the flow charts, by executing computer-readable program code stored in one or more non-transitory memories 139 inside the controller 102 and/or outside the controller 102 (e.g., in random access memory (RAM) 116 or read-only memory (ROM) 118). As another example, the one or more components can include circuitry, such as, but not limited to, logic gates, switches, an application specific integrated circuit (ASIC), a programmable logic controller, and an embedded microcontroller.

In one example embodiment, the non-volatile memory controller 102 is a device that manages data stored on non-volatile memory and communicates with a host, such as a computer or electronic device, with any suitable operating system. The non-volatile memory controller 102 can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware (and/or other metadata used for housekeeping and tracking) to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card-based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, double-data-rate (DDR) interface, or serial attached small scale compute interface (SAS/SCSI). Storage module 200, in one embodiment, may be a solid-state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCoE) interface. In one embodiment, the system illustrated in FIG. 1C may be a rack mountable mass storage system that is accessible by multiple host computers, such as would be found in a data center or other location where mass storage is needed.

Referring again to FIG. 2A, the controller 102 in this example also includes a front-end module 108 that interfaces with a host, a back-end module 110 that interfaces with the one or more non-volatile memory die 104, and various other components or modules, such as, but not limited to, a buffer manager/bus controller module that manage buffers in RAM 116 and controls the internal bus arbitration of controller 102. A module can include one or more processors or components, as discussed above. The ROM 118 can store system boot code. Although illustrated in FIG. 2A as located separately from the controller 102, in other embodiments one or both of the RAM 116 and ROM 118 may be located within the controller 102. In yet other embodiments, portions of RAM 116 and ROM 118 may be located both within the controller 102 and outside the controller 102.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface.

The controller 102 in this example also comprises a media management layer 137 and a flash control layer 132, which controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller are optional components that are not necessary in the controller 102.

Figure 2B:
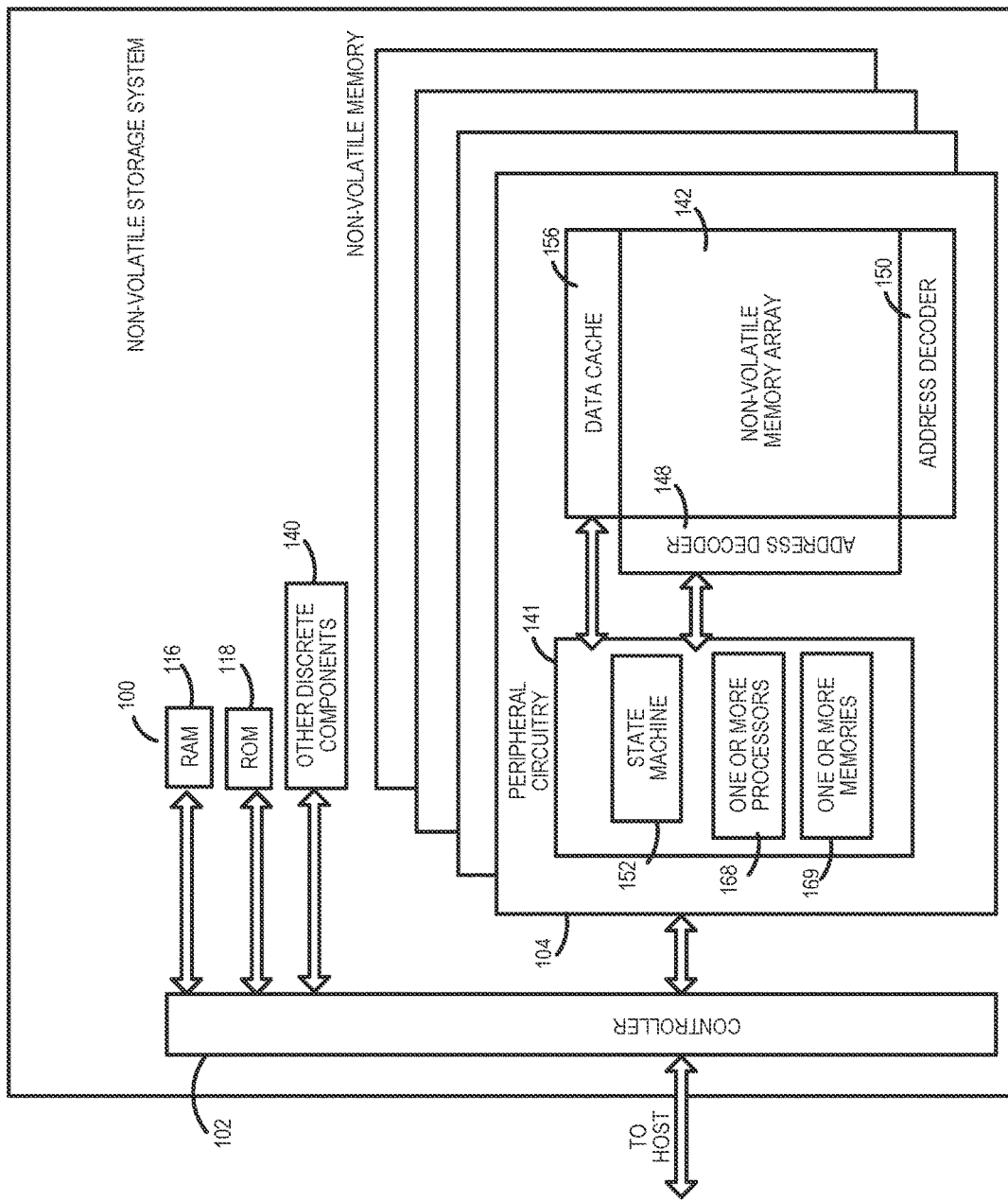
FIG. 2B is a block diagram illustrating components of the data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data and address decoders 148, 150. The peripheral circuitry 141 in this example includes a state machine 152 that provides status information to the controller 102. The peripheral circuitry 141 can also comprise one or more components that are, individually or in combination, configured to perform certain functions, including, but not limited to, the functions described herein and illustrated in the flow charts. For example, as shown in FIG. 2B, the memory die 104 can comprise one or more processors 168 that are, individually or in combination, configured to execute computer-readable program code stored in one or more non-transitory memories 169, stored in the memory array 142, or stored outside the memory die 104. As another example, the one or more components can include circuitry, such as, but not limited to, logic gates, switches, an application specific integrated circuit (ASIC), a programmable logic controller, and an embedded microcontroller.

In addition to or instead of the one or more processors 138 (or, more generally, components) in the controller 102 and the one or more processors 168 (or, more generally, components) in the memory die 104, the data storage device 100 can comprise another set of one or more processors (or, more generally, components). In general, wherever they are located and however many there are, one or more processors (or, more generally, components) in the data storage device 100 can be, individually or in combination, configured to perform various functions, including, but not limited to, the functions described herein and illustrated in the flow charts. For example, the one or more processors (or components) can be in the controller 102, memory device 104, and/or other location in the data storage device 100. Also, different functions can be performed using different processors (or components) or combinations of processors (or components). Further, means for performing a function can be implemented with a controller comprising one or more components (e.g., processors or the other components described above).

Returning again to FIG. 2A, the flash control layer 132 (which will be referred to herein as the flash translation layer (FTL) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
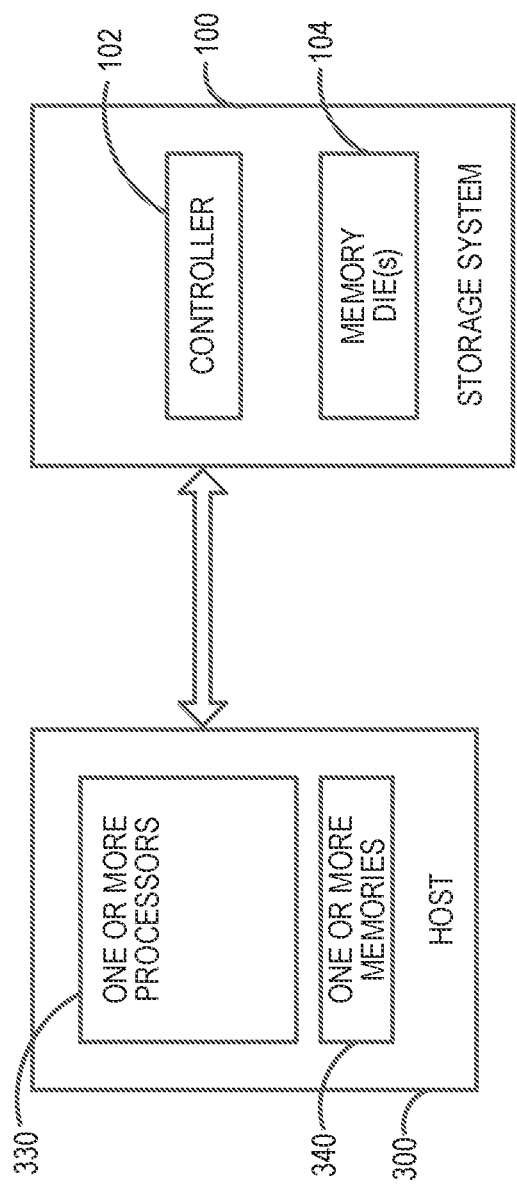
FIG. 3 is a block diagram of a host and a data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises one or more processors 330 and one or more memories 340. In one embodiment, computer-readable program code stored in the one or more memories 340 configures the one or more processors 330 to perform the acts described herein as being performed by the host 300. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

As mentioned above, typical read disturb (RD) phenomenon in a block of memory can get corrected once the block is erased and programmed. With newer three-dimensional memory generations, there can be a limit on the total number of reads that a block can sustain throughout its life. This is termed as accumulated read disturb or lifetime read disturb. The lifetime read disturb constraint is due to the threshold voltage (Vt) of any of the non-data wordlines (NDWLs) (e.g., wordlines that do not store data) moving out of a designated threshold voltage (Vt) window. The NDWL disturb can also happen due to the total number of reads as opposed to the total number of program/erase cycles in earlier memory generations. Once the select gate on the drain side (SGD) is disturbed beyond a certain limit, it can result in data loss for the user, and the block can become un-usable.

Figure 10:
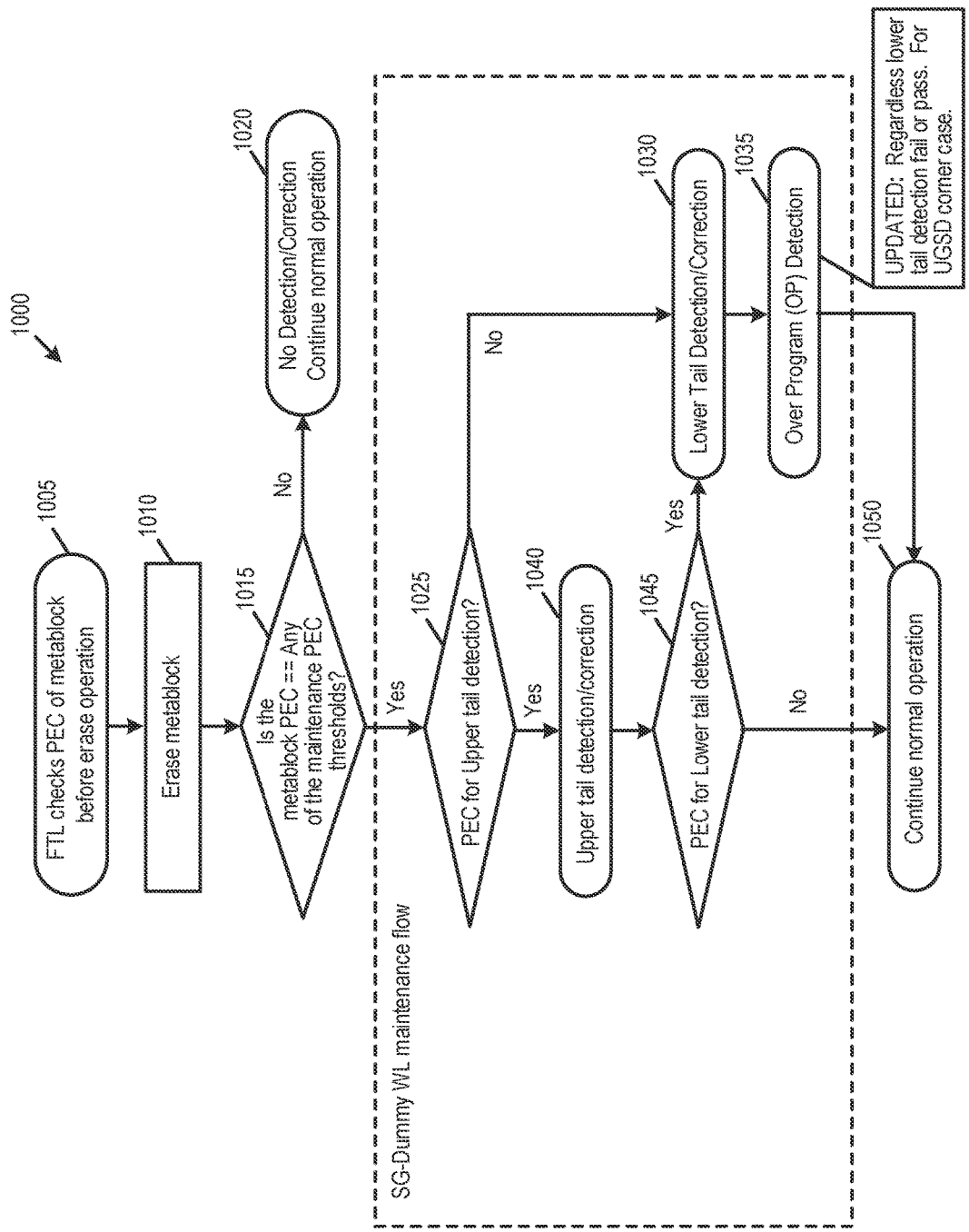
FIG. 10 is a flow chart of a prior art method for non-data wordline (NDWL) maintenance.

The lifetime/accumulated read disturb problem can be partially addressed using NDWL maintenance, which can be triggered after a certain number of program erase cycles (PEC). FIG. 10 is a flow chart 1000 of a prior art method for non-data wordline (NDWL) maintenance. As shown in FIG. 10, in this method, a controller of a data storage device checks the PEC of the metablock before an erase operation (1005). The controller then erases the metablock (1010) and determines if the metablock PEC is equal to the maintenance PEC thresholds (1015). If it is not, no detection/correction is needed, and the controller continues with its normal operation (1020). However, if it is, the controller performs a select gate (SG) dummy wordline maintenance flow. In this flow, the controller determines if the PEC of the upper tail is detected (1025). If it is, the controller attempts to detect and correct the upper tail (104) and then determines if the PEC for the lower tail is detected (1045). If the PEC for the lower tail is not detected, the controller 102 continues with its normal operation (1050). However, if the PEC for the lower tail is detected, the controller performs a lower tail detection/correction process (1030) and then performs an over program (OP) direction process (1035), which is done regardless of whether the lower tail detection fails or passes (for an ungraceful shutdown corner case). Then, the controller continues with normal operations (1050).

If the NDWL/SGD Vt is shifted due to lifetime read disturb, this can be detected and corrected using the above flow. However, if the host is very read intensive and does not write to the memory that often, the NDWL flow may not be triggered frequently enough to address the issue of lifetime read disturb.

The following embodiments provide several solutions that can address the issue of lifetime read disturb. Some of these embodiments can be implemented at the firmware level, whereas other embodiments can be implemented at a higher level (e.g., at the architecture level).

In one embodiment, the controller 102 in the data storage device is configured to detect the lifetime read disturb issue in the read path. As mentioned above, if the total reads happening on the blocks go beyond a certain number (say 'x' million reads), it will disturb non-data wordlines, resulting in data loss as well as a grown bad block (GBB). If the data storage device 100 does not have counters per block to keep track of this, the total data read (e.g., terabytes read (TBR)) from the memory 104 can be recorded and read from a log in the data storage device 100. So, a certain TBR threshold can be used as a trigger mechanism for NDWL maintenance. In the proposed flow, the controller 102 can check a block against a TBR threshold for triggering NDWL maintenance flow. So, even in the case of read-intensive workloads where PEC is not incrementing much, NDWL flow will be triggered, unlike in current NDWL flows.

Adding a bit error rate (BER) based NDWL trigger on top of TBR-based trigger in the read path can further help detect this lifetime read disturb issue, and there can be more-detailed checks added to the BER-based NDWL trigger. The lifetime read disturb can occur on edge blocks only, and the typical symptom for this issue is a higher-than-normal erase upper tail on the last few wordlines of these blocks. So, in one example, an extra sequence of an erase upper tail check can be added to precisely enter into NDWL maintenance only when BER is higher on those highly-susceptible wordlines of such blocks. These detailed checks can help enter NDWL maintenance more precisely as frequently entering NDWL maintenance can affect system performance/latency.

Figure 4:
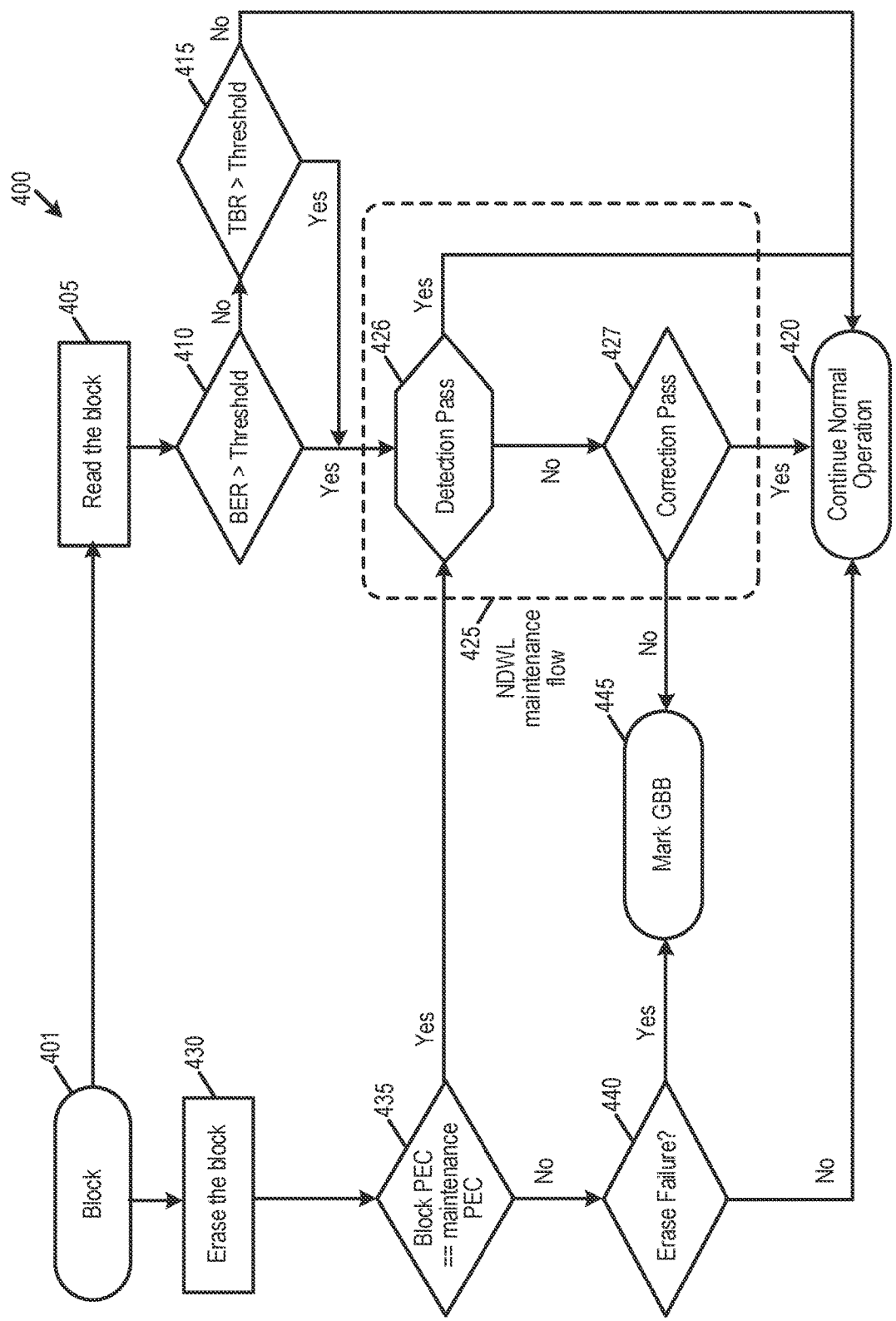
FIG. 4 is a flow chart of a method of an embodiment for non-data wordline (NDWL) maintenance flow to address lifetime read disturb.

Turning again to the drawings, FIG. 4 is a flow chart 400 of a method of an embodiment for NDWL maintenance flow to address lifetime read disturb. As shown in FIG. 4, for a block (401) in the memory 104, the controller 102 reads the block (405) and determines if the bit error rate (BER) is greater than a first threshold (act 410). If the BER is not greater than the threshold, the controller 102 determines if the total number of byres read (e.g., terabytes read (TBR)) is above a second threshold (415). The second (TBR) threshold can be determined in any suitable way, and FIG. 5 shows a table of a TBR threshold calculation for an example implementation. As shown in that table, in this example, one block is read approximately one million times, and the threshold is set to half the value of the total TBR (beyond that value, the NDWL maintenance flow should be triggered).

If the TBR is not above the second threshold, the controller 102 continues with normal operations (420). However, if the BER is above the first threshold or if the TBR is above a second threshold, the controller 102 performs an NDWL maintenance flow (425). In that flow, the controller 102 determines if a detection attempt passes (426). In one example, for NDWL detection, the controller 102 sets the NAND parameters for upper tail detection. The controller 102 issues read operation on the NDWL and, if the upper tail detection bit fails, the controller 102 relinks a new physical block and continue normal operations. If all the flask interface modules (FIMs) are checked and there is no upper tail detection of a bit failure, the controller 102 moves to lower tail detection. In lower tail detection, the controller 102 sets the PEC and NAND parameters for lower tail detection. The controller 102 issues read operation on the NDWL. If the lower tail detection bit fails, the controller 102 flags the location of the FIM/die/plane/block for lower tail correction.

With reference again to FIG. 4, if the detection attempt passes, the controller 102 continues with normal operations (420). However, if the detection attempt does not pass, the controller 102 determines if a correction attempt passes (427). In one example embodiment, for NDWL correction, the controller 102 sets the NAND parameters for the flagged blocks for lower tail program. The controller 102 issues program operation on the NDWL and checks the program status. If the program status fails, the controller 102 resets the NAND parameters and mark the block as a GBB. If the program status passed, the controller 102 checks the block for over programming. If the block is not over programmed, the controller 102 resets the NAND parameters and continues normal operation. So, with reference again to FIG. 4, if the correction attempt passes, the controller 102 continues with normal operations (420). However, if the correction attempt does not pass, the controller 102 marks the block as a grown bad block (GBB) (445).

If the controller 102 erases the block (430), the controller 102 determines whether the block program erase count (PEC) is equal to the maintenance PEC (435). If the block program erase count (PEC) is equal to the maintenance PEC, the controller 102 performs the NDWL maintenance flow (425), as described above. However, if the block program erase count (PEC) is not equal to the maintenance PEC, the controller 102 determines if there is an erase failure (440). If there is an erase failure, the controller 102 marks the block as a grown bad block (GBB) (445). Otherwise, the controller 102 continues with normal operations (420).

So, in this example embodiment, a block is erased, and the PEC is checked. If the PEC is equal to the maintenance PEC threshold, NDWL detection is started. If there is an erase failure, the block is marked as a GBB; otherwise, normal operations occur. The block is read, and BER is checked against a predetermined threshold. If the BER is greater than the threshold, NDWL detection occurs. If the BER is less than the threshold and TBR is greater that the predetermined threshold, NDWL handling occurs. If the TBR is less that the threshold, normal operations continue on the block. If the detection phase does not pass, correction happens for the block followed by normal operations. If correction does not pass, the block is marked as a GBB.

Turning now to another embodiment, today, wear levelling is typically totally based on PEC count. However, with the fact that the block can become bad purely based on the total number of reads throughout its lifetime, there can be some wear leveling done based on read as well. This embodiment can be sub-divided in two parts: (1) read count based on cold data block allocation and (2) using read count in the overall wear levelling mechanism. Regarding read count based on cold data block allocation, this can be done by monitoring the read counts on each block. For blocks showing high read counts, the controller 102 can avoid allocating them in the next program-erase cycle. This can prevent a runaway block based on read counts.

Figure 6:
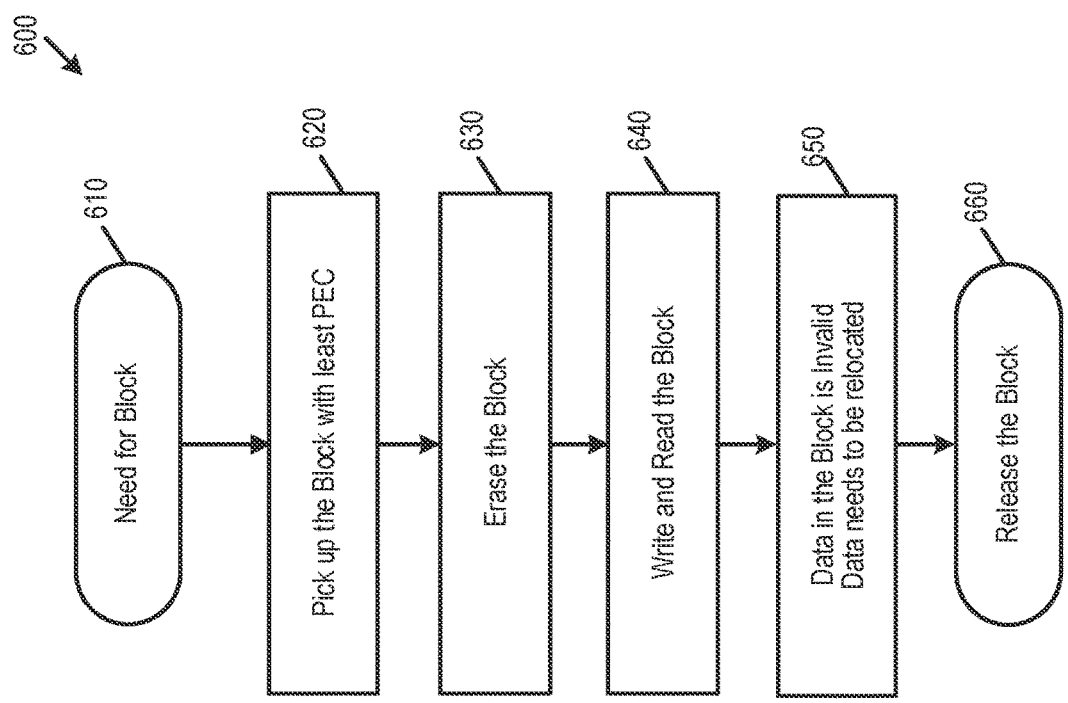
FIG. 6 is a flow chart of a wear leveling flow of an embodiment.
Figure 7:
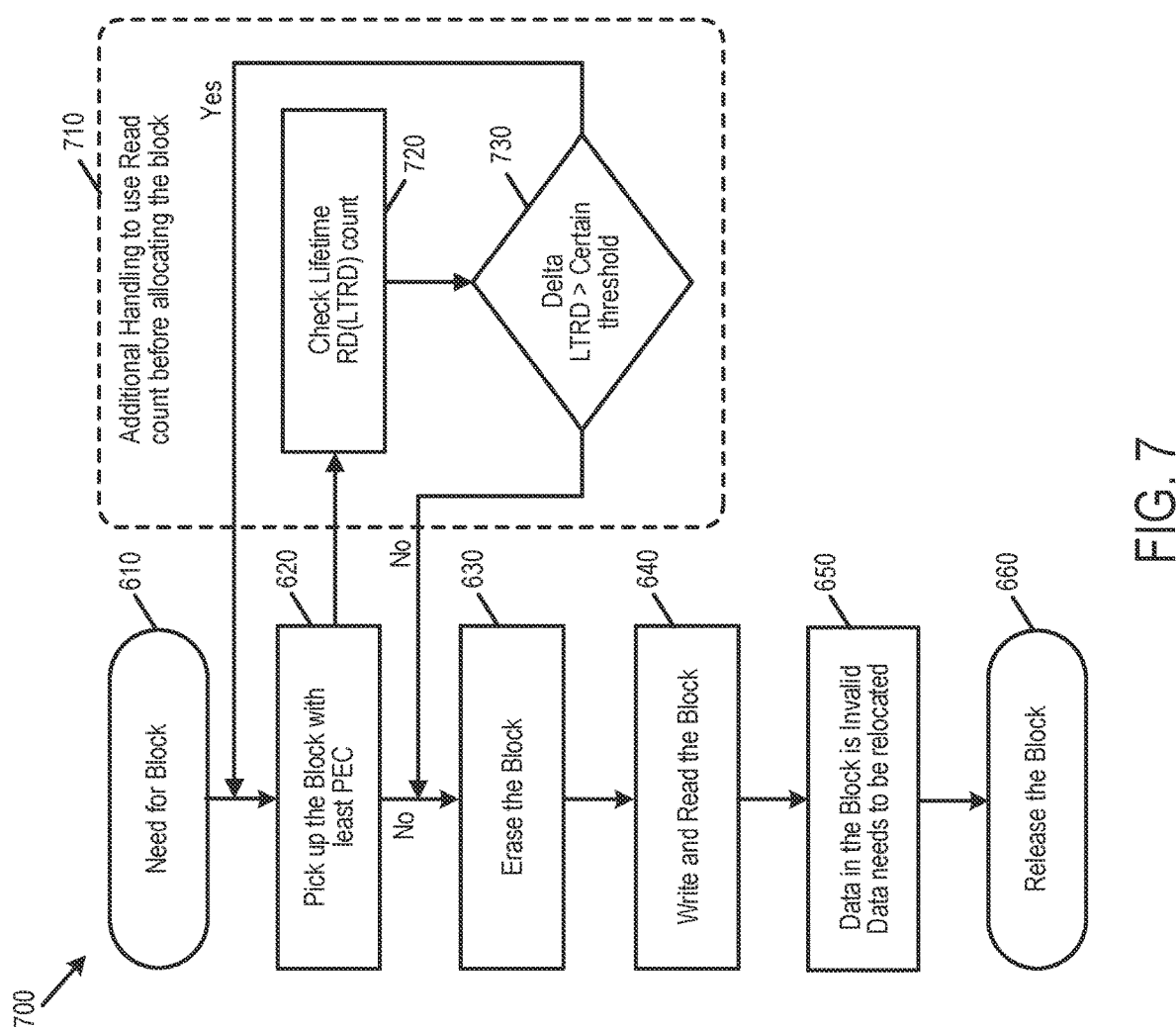
FIG. 7 is a flow chart of an alternate wear leveling flow of an embodiment.
Figure 8:
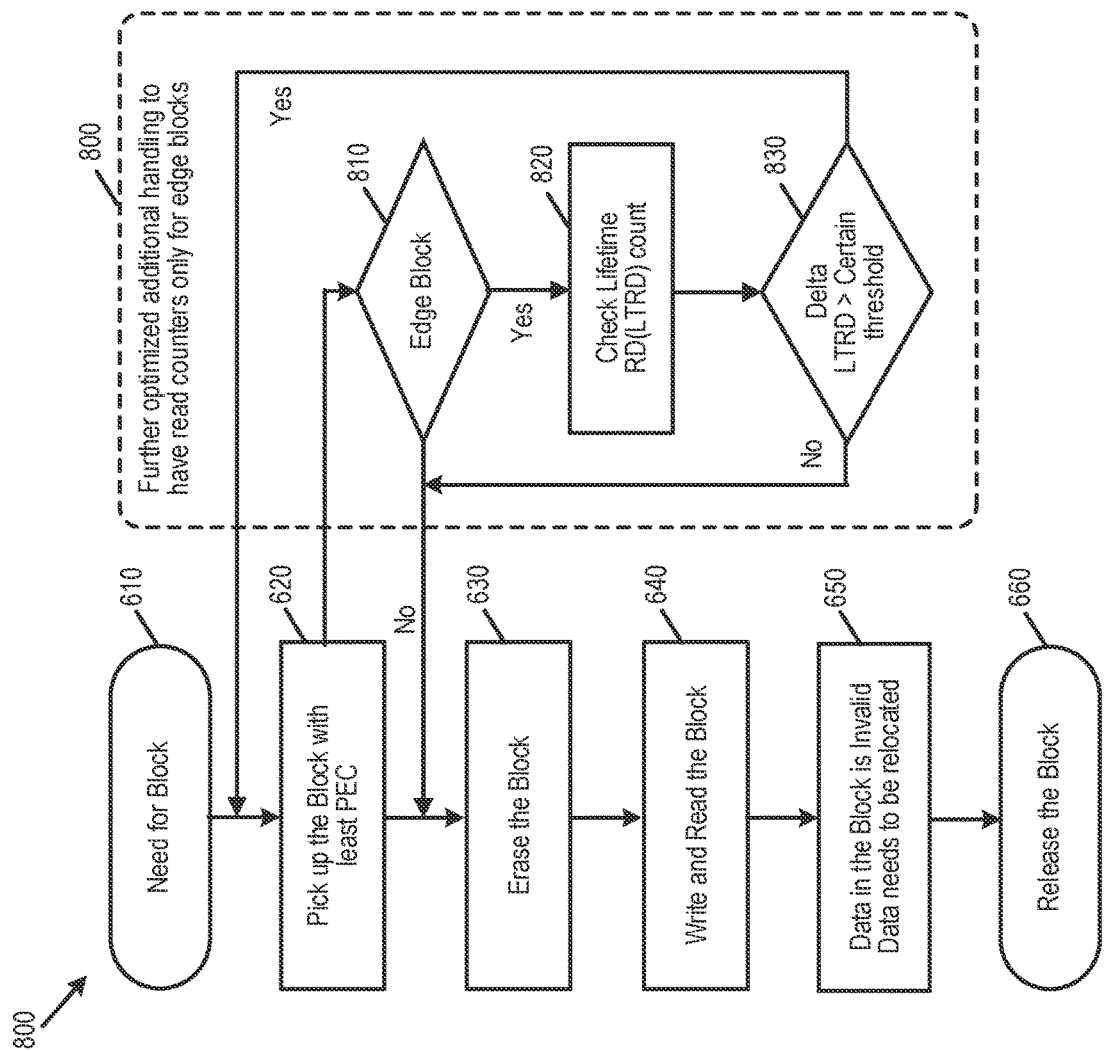
FIG. 8 is a flow chart of another alternate wear leveling flow of an embodiment.

Given that the lifetime read disturb issue due to NDWL Vt shift happens on edge blocks alone, read counts can be monitored only for those blocks and then only cold data (based on read point of view) can be placed in such blocks. This mechanism can further reduce the system/firmware/RAM overhead to maintain read count per block or meta block. FIGS. 6-8 illustrate this embodiment, which uses wear-leveling flow to address the lifetime read disturb issue.

FIG. 6 is a flow chart 600 of a typical wear leveling flow. As shown in FIG. 6, when the controller 102 determines a need for a block (600), and the controller 102 selects the block with the lowest PEC (620). The controller 102 then erases the block (630) and writes and reads the block (640). If the data in the block is invalid, the data needs to be relocated (650), after which the block is released (660).

FIG. 7 is a flow chart 700 of an alternate wear leveling flow of an embodiment. As shown in FIG. 7, when the controller 102 determines a need for a block (700), the controller 102 selects the block with the lowest PEC (720). The controller 102 then erases the block (730) and writes and reads the block (670). If the data in the block is invalid, the data needs to be relocated (750), after which the block is released (760). However, after the controller 102 selects the block, the controller 102 performs additional handling to use the read count before allocating the block. More specifically, the controller 102 checks the lifetime read (LTRD) count of the block (720) and determines if the LTRD is greater than a certain threshold (730). If it is, the method loops back to 620. If it is not, the method proceeds to 630.

FIG. 8 is a flow chart 800 of another alternate wear leveling flow of an embodiment. As shown in FIG. 8, when the controller 102 determines a need for a block (800), the controller 102 selects the block with the lowest PEC (820). The controller 102 then erases the block (830) and then writes and reads the block (840). If the data in the block is invalid, the data needs to be relocated (850), after which the block is released (860). However, after the controller 102 selects the block, the controller 102 further optimizes additional handling to have read counters only for edge blocks. More specifically, the controller 103 determines if the block is an edge block (810). If the block is not an edge block, the method proceeds to 830. However, if the block is an edge block, the controller 102 checks the lifetime read disturb (LTRD) count of the block (820) and determines if the delta LTRD is greater than a certain threshold (730). If it is, the method loops back to 620. If it is not, the method proceeds to 630.

In summary, FIG. 6 shows that typical wear levelling uses only PEC while picking-up the block, whereas in the embodiment shown in FIG. 7, the controller 102 uses LTRD count along with PEC while picking up the block. Further, the embodiment shown in FIG. 8 has an edge block check on top of LTRD count to minimize the counters that the system/firmware maintains while solving this problem.

The second sub-part (using read count in the overall wear levelling mechanism) will now be discussed. In many data workloads for data storage devices, such as SSDs (both client and enterprise), some portions of data are frequently read, while others are simply stored with minimal reads on those data blocks. To ensure that, at the system level, none of the memory blocks surpass the lifetime read count, certain changes can be made to the wear leveling algorithm. Currently, the wear leveling algorithm is solely based on the PEC and does not take into account any reads at all. In this embodiment, the controller 102 can increment the block PEC if the number of reads on that block crosses a certain threshold. After the threshold is crossed, the controller 102 can increase the PEC of the block. The existing wear leveling algorithm can subsequently ensure that none of the blocks in the system exceed the lifetime block read count before the block PEC reaches the end of its life.

An example of this embodiment is provided below the uses the following assumptions:

Maximum PEC allowed per block=2000

Maximum number of reads allowed on a block throughout its lifetime=1000M

To maintain a lifetime read count, the maximum read allowed for a block for each erase cycle=1000M/2K=0.5M So, in this example, for every 0.5M blocks reads, the controller 102 will increment the block PEC by one.

If the block read count exceeds 0.5M before the block is marked free, the controller 102 can increase the block erase count by one. If the block read count exceeds 1M read, the controller 102 can increase the PEC by two.

The current wear leveling algorithm picks up blocks with the lowest PEC. Therefore, this block should not be get picked. Even if it does get picked and it is a read-intensive workload, with a read count of 0.5M every time, this block will be cycled (erased) only 1000 times, maintaining the block's lifetime read count at 1000M.

Figure 9:
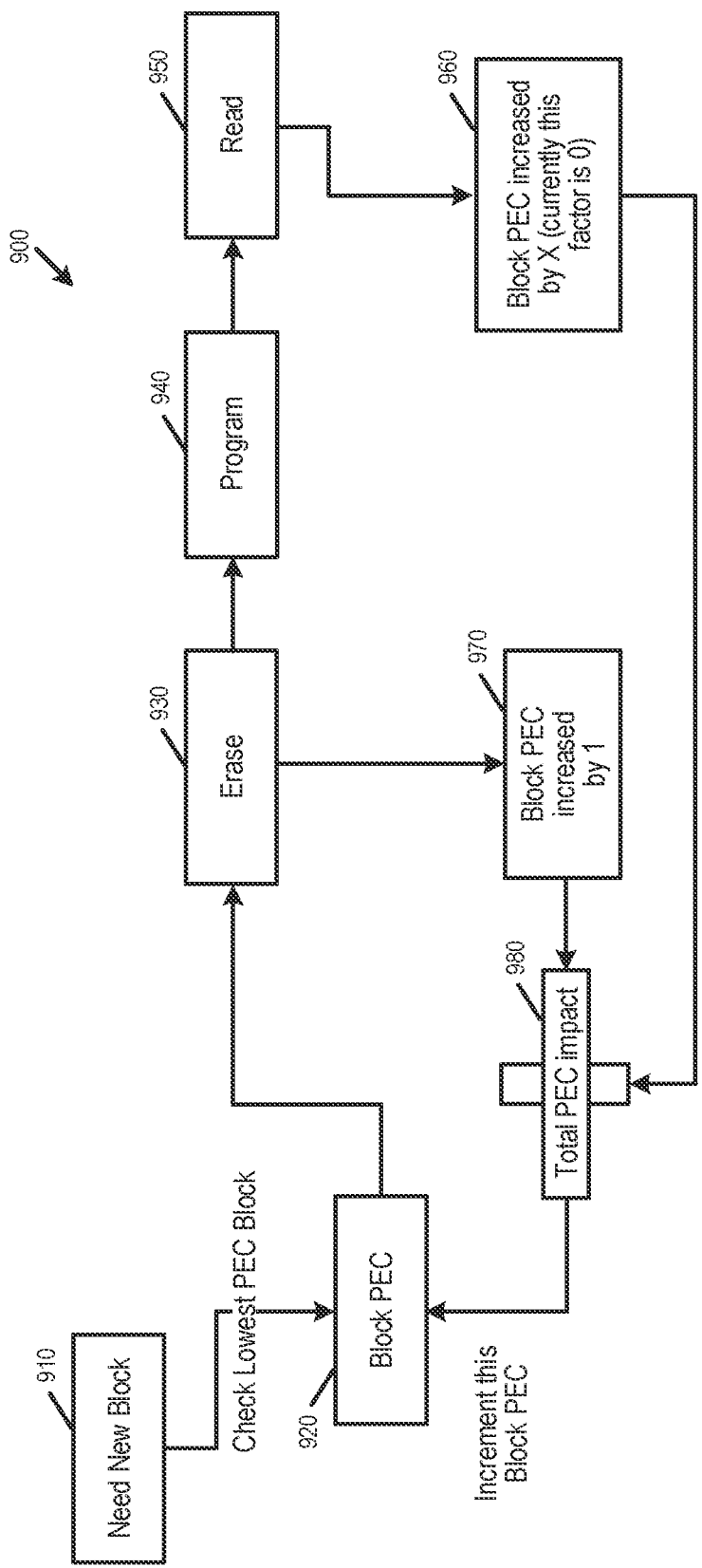
FIG. 9 is a flow chart of block program-erase count maintenance method of an embodiment.

FIG. 9 is a flow chart 900 of block PEC maintenance method of an embodiment. As shown in FIG. 9, after the controller 102 determines a need for a new block (910), the controller 102 checks the lowest PEC block (920). The controller 102 then erases (940), programs (950), and reads (960) the block. The controller 102 then increases the PEC of the block by X (960), which is added to the total PEC impact (980). Also, after the block is erased, the controller 102 increases the block PEC by 1 (970) and adds it to the total PEC impact (980). After the addition to the total PEC impact, the controller 102 increments this block's PEC, and the method loops back to 920.

It should be noted that block-based counters used in this embodiment can increase the ASIC RAM budgets. In case there is a RAM budget concern, the read-based counter can be applied to edge blocks only, which are susceptible to the lifetime read disturb issue. So, the PEC of only these blocks can be incremented if the read count exceeds the threshold. It should also be noted that this embodiment accounts for reads also for wear levelling purpose, whereas existing wear levelling algorithms use only PEC. Here, reads can be used to resolve the lifetime read disturb issue, but there can be other scenarios where this concept of read-based wear leveling can be used in data storage devices, such as SSDs.

There are several advantages associated with these embodiments. For example, these embodiments can improve the quality/reliability of the data storage device by preventing the data loss, preventing grown bad blocks, and, ultimately, preventing the data storage device from becoming read only. These embodiments can also allow the block to be good for a longer time in read-intensive workloads. Given that today's trending applications, such as artificial intelligence, machine learning, and deep learning, are write-once and read multiple times, these embodiments can enhance the life of the data storage device for such workloads and applications.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two-dimensional configuration, e.g., in an x-z plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
   a memory; and
   one or more processors, individually or in combination, configured to:
      in response to erasing a block in the memory:
         determine whether a program-erase count of the block is equal to a maintenance program-erase count; and
         in response to determining that the program-erase count of the block is equal to the maintenance program-erase count:
            perform a maintenance operation on a non-data wordline in the block;
            determine whether the maintenance operation was successful; and
            in response to determining that the maintenance operation was not successful, mark the block as a grown bad block; and
      in response to reading the block;
         determine whether a bit error rate of the block is above a first threshold;
         in response to determining that the bit error rate of the block is above the first threshold:
            perform the maintenance operation on the non-data wordline in the block; and
            in response to determining that the maintenance operation was not successful, mark the block as a grown bad block; and
         in response to determining that the bit error rate of the block is not above the first threshold:
            determine whether a lifetime total amount of data read from the block is above a second threshold; and
            in response to determining that the lifetime total amount of data read from the block is above the second threshold:
               perform the maintenance operation on the non-data wordline in the block; and
               in response to determining that the maintenance operation was not successful, mark the block as a grown bad block.

2. The data storage device of claim 1, wherein the one or more processors, individually or in combination, are further configured to:
   in response to determining that the lifetime total amount of data read from the block is not above the second threshold, perform additional operations without performing the maintenance operation on the non-data wordline in the block.

3. The data storage device of claim 1, wherein the one or more processors, individually or in combination, are further configured to:
   in response to determining that the program-erase count of the block is not equal to the maintenance program-erase count:
      determine whether erasing the block was successful; and
      in response to determining that erasing the block was not successful, mark the block as a grown bad block.

4. The data storage device of claim 3, wherein the one or more processors, individually or in combination, are further configured to:
   in response to determining that erasing the block was successful, perform additional operations without performing the maintenance operation on the non-data wordline in the block.

5. The data storage device of claim 1, wherein the one or more processors, individually or in combination, are further configured to perform the maintenance operation on the non-data wordline in the block by performing a detection operation and performing a correction operation in response to the detection operation not passing.

6. The data storage device of claim 1, wherein the memory comprises a three-dimensional memory.

7. A data storage device comprising:
   a memory; and
   means for:
      in response to erasing a block in the memory:
         determining whether a program-erase count of the block is equal to a maintenance program-erase count; and
         in response to determining that the program-erase count of the block is equal to the maintenance program-erase count:
            performing a maintenance operation on a non-data wordline in the block;
            determining whether the maintenance operation was successful; and
            in response to determining that the maintenance operation was not successful, marking the block as a grown bad block; and
      in response to reading the block;
         determining whether a bit error rate of the block is above a first threshold;
         in response to determining that the bit error rate of the block is above the first threshold:
            performing the maintenance operation on the non-data wordline in the block; and
            in response to determining that the maintenance operation was not successful, marking the block as a grown bad block; and
         in response to determining that the bit error rate of the block is not above the first threshold:
            determining whether a lifetime total amount of data read from the block is above a second threshold; and
            in response to determining that the lifetime total amount of data read from the block is above the second threshold:
               performing the maintenance operation on the non-data wordline in the block; and
               in response to determining that the maintenance operation was not successful, marking the block as a grown bad block.

8. In a data storage device comprising a memory, a method comprising:
   in response to erasing a block in the memory:
      determining whether a program-erase count of the block is equal to a maintenance program-erase count; and
      in response to determining that the program-erase count of the block is equal to the maintenance program-erase count:

performing a maintenance operation on a non-data wordline in the block;
determining whether the maintenance operation was successful; and
in response to determining that the maintenance operation was not successful, marking the block as a grown bad block; and
in response to reading the block;
determining whether a bit error rate of the block is above a first threshold;
in response to determining that the bit error rate of the block is above the first threshold:
performing the maintenance operation on the non-data wordline in the block; and
in response to determining that the maintenance operation was not successful, marking the block as a grown bad block; and
in response to determining that the bit error rate of the block is not above the first threshold:
determining whether a lifetime total amount of data read from the block is above a second threshold; and
in response to determining that the lifetime total amount of data read from the block is above the second threshold:
performing the maintenance operation on the non-data wordline in the block; and
in response to determining that the maintenance operation was not successful, marking the block as a grown bad block.

9. The method of claim 8, further comprising:
in response to determining that the lifetime total amount of data read from the block is not above the second threshold, performing additional operations without performing the maintenance operation on the non-data wordline in the block.

10. The method of claim 8, further comprising:
in response to determining that the program-erase count of the block is not equal to the maintenance program-erase count:
determining whether erasing the block was successful; and
in response to determining that erasing the block was not successful, marking the block as a grown bad block.

11. The method of claim 8, further comprising performing the maintenance operation on the non-data wordline in the block by performing a detection operation and performing a correction operation in response to the detection operation not passing.

* * * * *